United States Patent [19]

Glasberg

[11] Patent Number: 4,614,265
[45] Date of Patent: Sep. 30, 1986

[54] APPARATUS FOR AUTOMATICALLY SPLITTING TRANSFER FEED RAILS IN A TRANSFER FEED PRESS

[75] Inventor: Lucian Glasberg, Skokie, Ill.

[73] Assignee: Danly Machine Corporation, Chicago, Ill.

[21] Appl. No.: 757,809

[22] Filed: Jul. 22, 1985

[51] Int. Cl.$^4$ .............................................. B65G 25/00
[52] U.S. Cl. ...................................... 198/774; 72/405; 414/749
[58] Field of Search .................. 198/774, 621; 72/405, 72/421; 104/48, 99, 35, 130; 414/749, 751

[56] References Cited

U.S. PATENT DOCUMENTS

| 2,931,316 | 4/1960 | Blackwell | 104/48 |
| 4,051,955 | 10/1977 | Kaffka | 198/774 X |
| 4,094,252 | 6/1978 | Pater et al. | 104/130 |
| 4,436,199 | 3/1984 | Baba et al. | 198/621 X |
| 4,503,969 | 3/1985 | Baba | 198/621 |
| 4,555,012 | 11/1985 | Baba et al. | 414/749 X |
| 4,557,133 | 12/1985 | Mikusch et al. | 198/621 X |
| 4,557,370 | 12/1985 | Tanaka | 198/774 X |

OTHER PUBLICATIONS

Publication of Danly Machine Corporation entitled "Transfer Feed Presses", 1968.

Primary Examiner—Joseph E. Valenza
Assistant Examiner—Jonathan D. Holmes
Attorney, Agent, or Firm—Leydig, Voit & Mayer, Ltd.

[57] ABSTRACT

In a transfer feed press having a vertically movable slide, one or two longitudinally movable multi-segment transfer feed rails for moving workpieces through the press, a bolster movable transversely in and out of the press and vertically within the press, and vertically movable rail support stands on the bolster, a die-changing control system comprising the combination of at least two controllable motor-actuated means for connecting and disconnecting the transfer feed rail segments; means for generating electrical signals representing the press slide position, the rail position along the longitudinal, transverse and vertical axes, the bolster position along the transverse and vertical axes, and the position of the rail support stands on the bolster; and control means for actuating the controllable motor-actuated means for connecting and disconnecting the transfer feed rail segments in response to the electrical signals when the press slide is in a raised position high enough to permit safe removal of the bolster and die from the press, the rail position is centered over the bolster and the rail support stands carried by the bolster, the bolster is in its advanced vertical position within the press, and the rail support stands on the bolster are in their raised positions.

21 Claims, 16 Drawing Figures

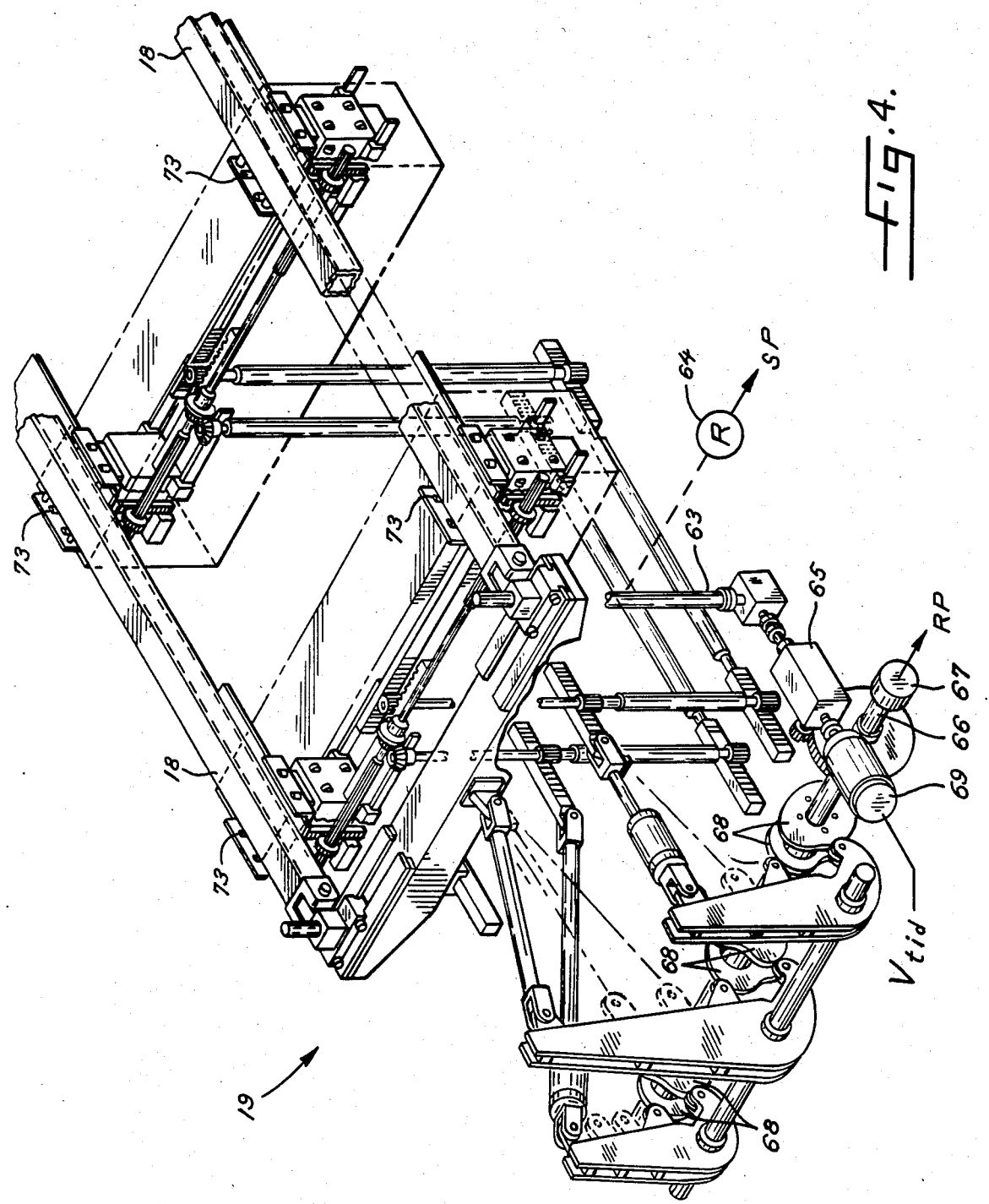

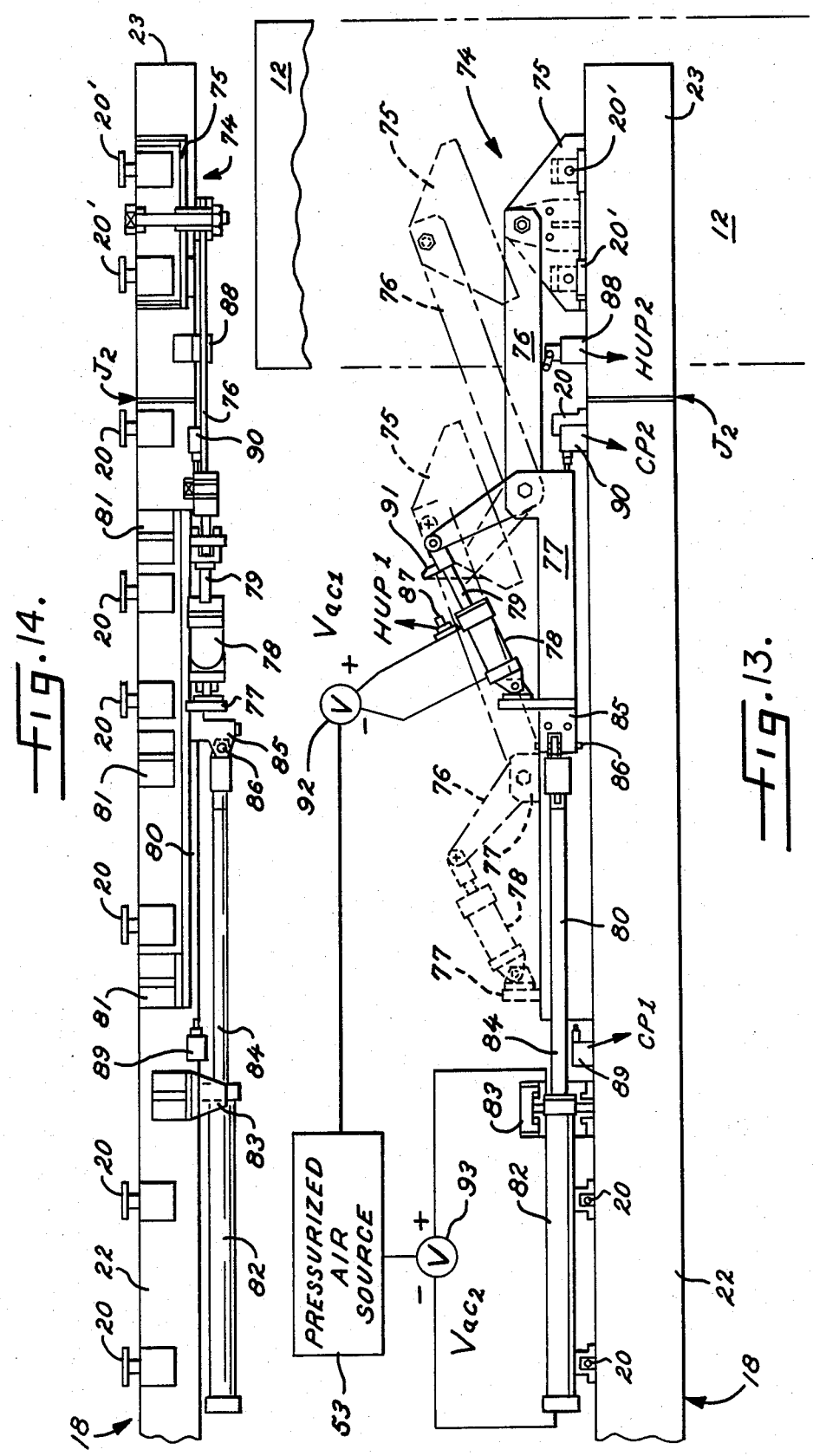

APPARATUS FOR AUTOMATICALLY SPLITTING TRANSFER FEED RAILS IN A TRANSFER FEED PRESS

TECHNICAL FIELD

The present invention relates generally to transfer feed presses, and, more particularly, to an apparatus for automatically splitting and re-joining the multi-segment transfer feed rails therein, and thereby enabling automatic die changing.

BACKGROUND ART

As is well known, the transfer feed press is a machine having a plurality of successive work stations wherein workpieces are pressed to form a variety of products. The transfer feed press generally comprises one or two transfer feed rails for transporting workpieces through the successive stations as well as into and out of the machine. These transfer feed rails are reciprocated longitudinally, transversely, and vertically in order to achieve the transport of the workpieces.

In order to change the die in a transfer feed press, the die-carrying bolster must be able to exit transversely from the press. Since the transfer feed rails extend along the sides of the die, they too must be transversely removable from the press. Therefore, the transfer feed rails must be divisible at joints so that central segments thereof can be removed transversely between the support columns of the press.

Previously used transfer feed presses have utilized connecting bolts between the feed rail segments such that the rails can only be split manually. Depending on the number of bolts connecting the rail segments, the process of manually disconnecting the rails, changing the die, and reconnecting the rails can require as much as 45-60 minutes, which is a long period of press inactivity.

Other previously used transfer feed presses, such as that disclosed in U.S. Pat. No. 4,503,969 to Baba, are provided with a plurality of motorized mechanisms for longitudinally moving the terminal segments of the transfer feed rails away from the central segments thereof so that the central segments can be transversely removed from the press. This construction is unsatisfactory in that providing a plurality of motorized mechanisms for moving the rail segments is very expensive.

SUMMARY OF THE INVENTION

It is a primary object of the present invention to provide an improved apparatus for automatically splitting and re-joining transfer feed rails which does not require rail drive mechanisms in addition to the main transfer drive mechanism used when the press is in operation.

It is another object of this invention to provide such an improved rail splitting apparatus which can be economically manufactured.

A further object of this invention is to provide a rail splitting apparatus which is readily adaptable to transfer feed presses in which the transfer feed rails must be split into different numbers of segments.

Other objects and advantages of the invention will be apparent from the following detailed description.

In accordance with the present invention, a transfer feed press having one or more multi-segment transfer feed rails is provided with an apparatus for automatically splitting and re-joining at least one of the transfer feed rails, comprising main transfer drive means attached to one end of the transfer feed rails for driving the transfer feed rails longitudinally, the main transfer drive means having rail position sensor means for generating signals regarding the longitudinal position of the transfer feed rails, first and second controllable motor means for driving the main transfer drive means, vertically movable support means for supporting at least one segment of the transfer feed rails, said support means having controllable vertical positioning means for selectively raising and lowering said support means, at least two controllable motor-actuated connection means for connecting and disconnecting the transfer feed rail segments, and microprocessor means for controlling the automatic splitting of the transfer feed rails having a program for generating a predetermined sequence of signals in response to predetermined manually-input signals and signals generated by various of the press components, said microprocessor means actuating said first and second controllable motor means to drive said main transfer drive means, and thereby said transfer feed rails, so that said transfer feed rails are moved through a predetermined sequence of longitudinal positions, actuating said vertical adjustment means so that, in response to the longitudinal positions of said transfer feed rails, said support means are moved vertically into and out of supporting contact with said transfer feed rails, and actuating each of said motor-actuated connection means in a predetermined sequence so that said transfer feed rail segments are connected and disconnected in response to the longitudinal positions of said transfer feed rails.

BRIEF DESCRIPTION OF THE DRAWINGS

FIG. 4 is a partially fragmented, isometric view of the tri-axial transfer feed mechanism of the transfer feed press.

FIG. 13 is a side view of the terminal rail segment finger unit removal mechanism.

FIG. 14 is a top view of the mechanism of FIG. 13.

DESCRIPTION OF THE PREFERRED EMBODIMENT

While the invention will be described in connection with certain preferred embodiments, it will be understood that it is not intended to limit the invention to these particular embodiments. On the contrary, it is intended to cover all alternatives, modifications, and equivalents included within the spirit and scope of the invention as defined by the appended claims.

Figure 1:
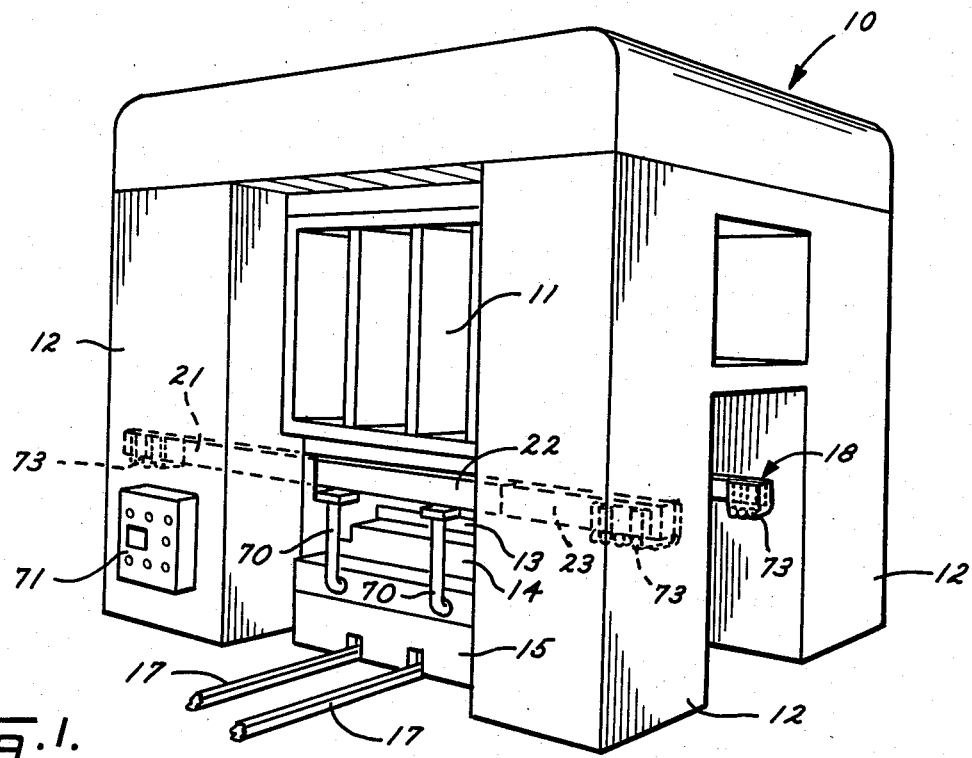
FIG. 1 is a perspective view showing the transfer feed press equipped with two segmented transfer feed rails and a transversely removable bolster.
Figure 2:
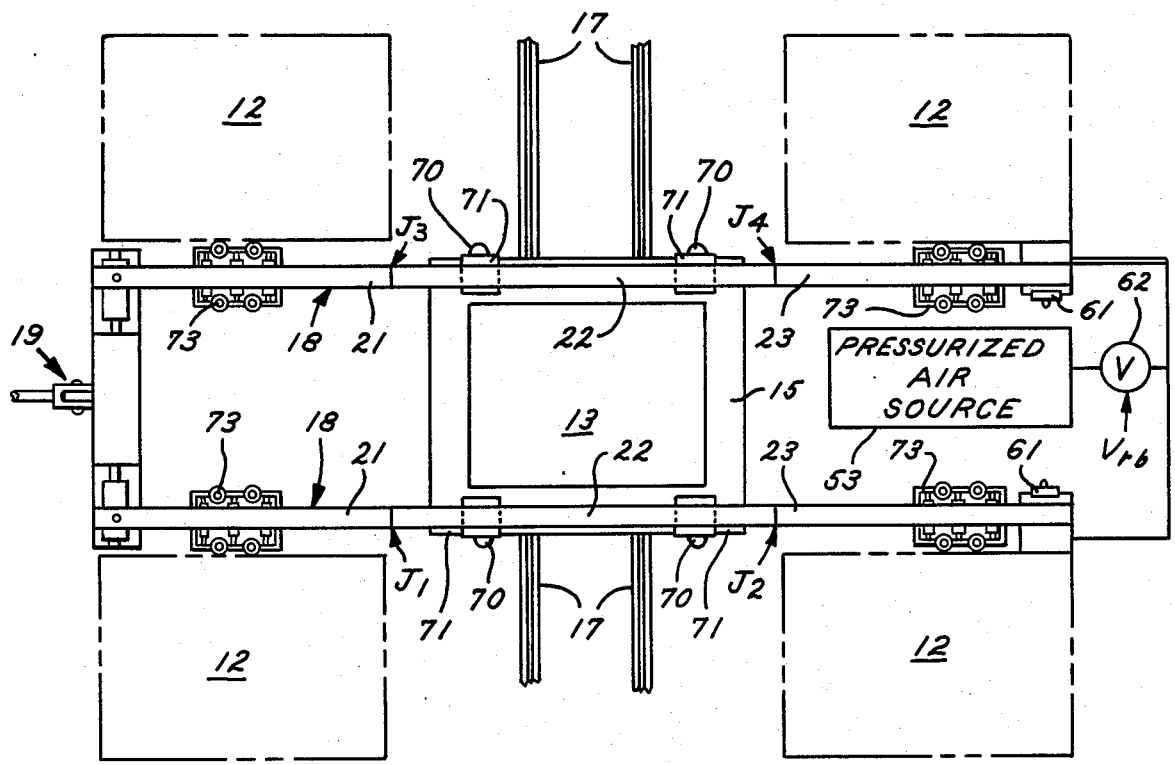
FIG. 2 is a top view of the transfer feed press of FIG. 1.

Turning now to the drawings and referring first to FIGS. 1 and 2, there is shown a transfer feed press 10 having a vertically movable slide 11 which is supportably guided by a plurality of columns 12. In working operation, the slide 11 carries the upper half of the die 13, and is reciprocated vertically through a full cycle by a conventional motor drive mechanism (not shown) such that the upper half of the die 13 and the stationary lower half of the die 14 are alternately brought into and out of contact. The lower half of the die 14 is supported by a bolster 15 which can be moved transversely in and out of the press slide region by means of motorized wheels 16 and tracks 17.

At least one hollow, transfer feed rail 18 (two are shown in the embodiment illustrated in the drawings) extends longitudinally through the transfer feed press 10 and is used to transport workpieces through successive workstations in the press. To accomplish this workpiece movement, the transfer feed rails 18 are reciprocated longitudinally, transversely, and vertically by a tri-axial transfer drive 19 (FIG. 4) as described in detail in the copending U.S. application of Votava entitled "Transfer Feed System For Power Presses", Ser. No. 735,437, filed May 17, 1985. As is well known and conventional in the art, spring-loaded finger units 20 (see FIGS. 13 and 14) are rigidly attached to the transfer feed rails 18 for actually handling the workpieces.

Figure 3:
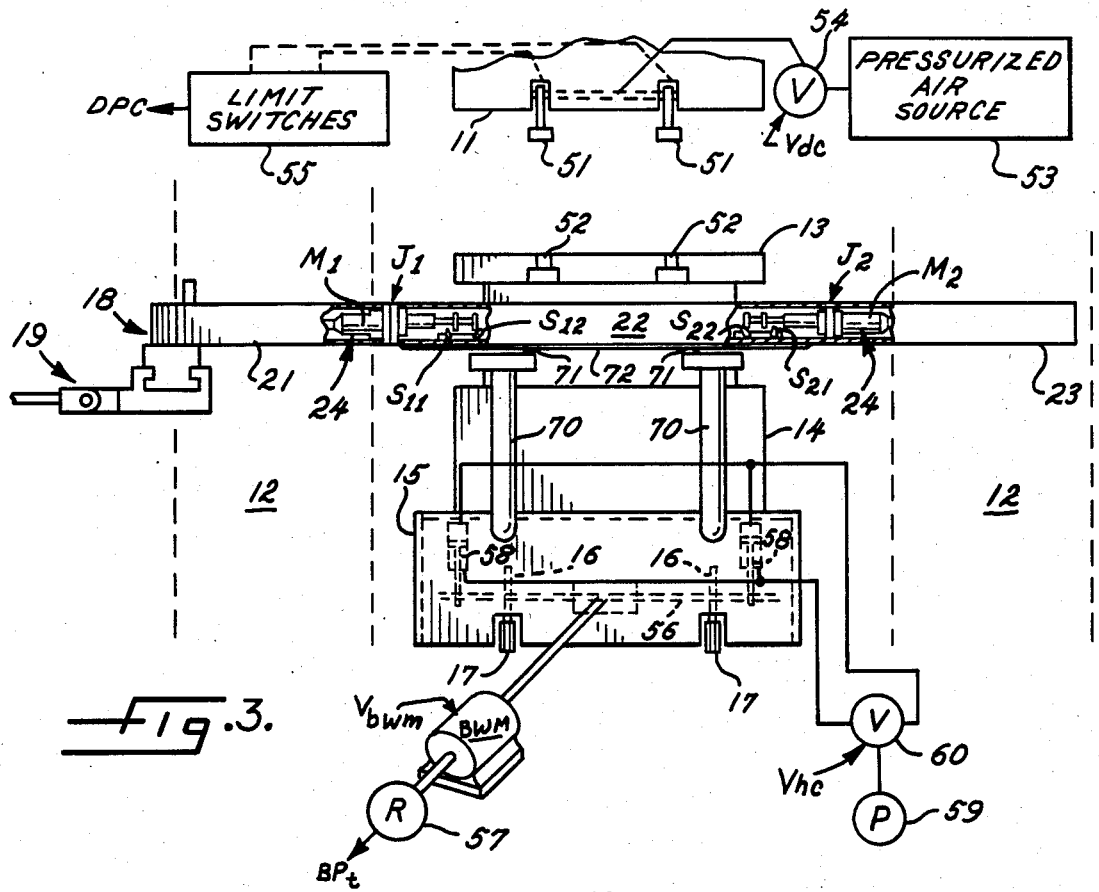
FIG. 3 is a diagrammatic view of the transfer feed press with controllable motor-actuated connection means, motorized means for driving the various relatively movable components, and sensors for signaling the values of component positional parameters.

In typical operation, various mechanisms for moving workpieces into and out of the transfer feed press are positioned at the longitudinal ends of the press, and consequently, the dies 13, 14 can only be removed from the press slide region in a transverse direction. However, as illustrated in FIG. 3, the upper half of the die 13, when detached from the slide 11 and resting on the lower half of the die 14 and the bolster 15, extends above the transfer feed rails 18. Since the transfer feed rails 18 extend along the inside of the columns 12, they are prevented from moving transversely outward. Therefore, at least one of the transfer feed rails 18 must be divided into a plurality of segments 21, 22, 23 such that the central segment 22, when detached from the terminal segments 21, 23, can be moved transversely outward between the columns 12, thereby allowing transverse removal of the dies 13, 14 and bolster 15 from the press slide region. Moreover, this transverse removal of the central segment 22 allows for changing of rail tooling (e.g., finger units 20) outside of the press slide region.

In accordance with the present invention, at least one of the transfer feed rails is constructed so as to have a plurality of segments with each joint separating the adjacent segments provided with a controllable motor-actuated connection means, the main transfer drive is provided with a rail position sensor for generating signals regarding the longitudinal position of the attached transfer feed rails, the die-carrying bolster is provided with vertically movable support stands for supporting the central segment of the transfer feed rail, and the transfer feed press is provided with a microprocessor for controlling the automatic splitting of the transfer feed rails and the automatic changing of the die.

Figure 5:
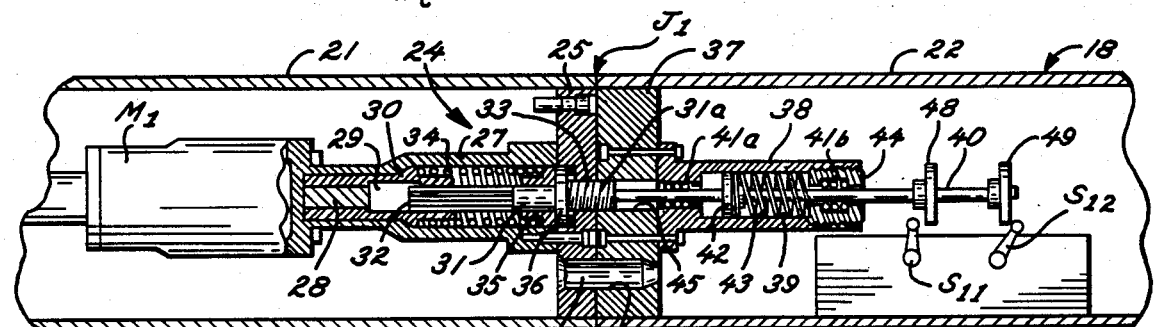
FIG. 5 is an enlarged view of the controllable motor-actuated connection means of FIG. 3 in the state of threaded engagement.
Figure 6:
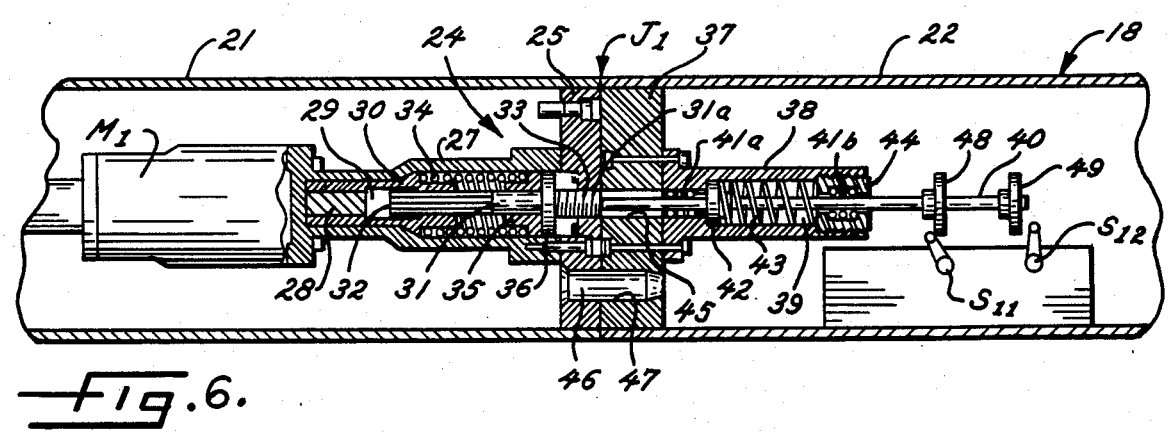
FIG. 6 is a view of the connection means of FIG. 5 in the state of disengagement.

More specifically, at least the front transfer feed rail 18 is divided at two joints $J_1$, $J_2$ into three segments 21, 22, 23 such that the central segment 22 can be moved transversely outward between the columns 12. Each of the joints $J_1$, $J_2$ is provided with a controllable motor-actuated connection mechanism 24 for connecting and disconnecting the adjacent rail segments to one another. As shown in FIGS. 3, 5, and 6, each connection mechanism 24 comprises two sections, the first of which is inserted in the end of one of the terminal rail segments (21 or 23), and the second of which is inserted in the end of the central rail segment 22.

The first section of the connection mechanism 24 has a housing consisting of a first end plate 25, which is rigidly secured to the end of the terminal rail segment (21 or 23), and a cylindrical body portion 27. Attached to the end of the cylindrical body portion 27, opposite the first end plate 25, is a motor ($M_1$ or $M_2$)—preferably an air motor, although a servo motor can also be used—which, when activated, rotates a shaft 28, which is keyed to a first cylindrical sleeve 30, having splines cut in its interior surface. Also positioned within the housing, and telescoping into a relief chamber 29 in the sleeve 30, is a cylindrical rod 31 which has splines 32 on its surface at one end and which is threaded at the other end 31a. The splines 32 correspond to the splines of the first cylindrical sleeve 30 such that the sleeve and the rod must rotate in unison about their common axis and yet are longitudinally slidable relative to each other. The threaded end 31a of the cylindrical rod 31 slidably extends through a circular aperture 33 in the first end plate 25. A spring 34 is compressed between the first cylindrical sleeve 30 and a second cylindrical sleeve 35, causing the second sleeve to abut a collar 36 rigidly attached to the cylindrical rod 31 and thereby biasing the cylindrical rod 31 so that its threaded end 31a normally extends beyond the first end plate 25.

The second section of the connection mechanism 24 has a second end plate 37 and a cylindrical housing 38 defining a chamber 39. Coaxial with the cylindrical housing 38, and extending therethrough, is a cylindrical rod 40, which is longitudinally slidable on a pair of ball bushings 41a, 41b retained at opposite ends of the cylindrical housing 38. Rigidly attached to the cylindrical rod 40, and located within the chamber 39, is a first collar 42. A spring 43 is compressed between this first collar and a threaded cylindrical member 44, which is threadably telescoped into the cylindrical housing 38 to form the end wall of the chamber 39, thereby biasing the rod 40 such that its first end is urged into a circular threaded bore 45 in the second end plate 37. This threaded bore 45 is aligned with the aperture 33 in the first end plate 25 when the two rail segments 21, 22 are properly aligned, as ensured by the coupling of two index pins 46 (only one is shown), extending from the first end plate 25, with corresponding sockets 47 in the second end plate 37, and therefore, the threaded end of the cylindrical rod 31 can be screwed into and out of threaded locking engagement with the threaded bore 45. The second end of the cylindrical rod 40 has second and third collars (48 and 49) attached thereto for tripping first and second limit switches ($S_{11}$ and $S_{12}$), respectively, as the rod 40 is moved longitudinally, as a result of its abutment with cylindrical rod 31, against the compressive force of the spring 43.

When the ends of the rail segments 21, 22 are brought into abutting alignment, the threaded cylindrical rod 31 in the first section is forced to recede against the compressive force of the spring 34, into housing 27 where it telescopes into the relief chamber 29 of the first cylindrical sleeve 30 (as illustrated in FIG. 6). The cylindrical rod 40 in the second section extends through the threaded bore 45 so that the first limit switch $S_{11}$ is tripped, indicating that the threaded rod 31 and the threaded bore 45 (and consequently, the two rail segments 21, 22) are not in threaded locking engagement. Upon receiving predetermined signals (described in greater detail below), the microprocessor 50 (FIG. 7) turns on the air motor $M_1$. As a result, the shaft 28 and the first cylindrical sleeve 30 are rotated, which in turn rotates the cylindrical rod 31. This causes the threaded portion 31a of the cylindrical rod 31 to screw into the threaded bore 45, thereby longitudinally displacing the cylindrical rod 40. Upon attainment of full engagement between the threaded rod 31 and the threaded bore 45, the second limit switch $S_{12}$ is tripped, indicating that the two rail segments are in full engagement. Subsequent disengagement of the rail segments is achieved simply by running the air motor $M_1$ in reverse.

It will be noted that engagement/disengagement of the second rail joint $J_2$ is accomplished by a controllable motor-actuated connection mechanism 24 identical to that used in the first rail joint $J_1$. Moreover, if it is desirable in a transfer feed press having a two rail design to split the rear transfer feed rail (so that the first bolster 15 and the dies 13, 14 can exit through the front of the transfer feed press, while a replacement bolster and die (not shown) enter through the rear), its joints $J_3$, $J_4$ (see FIG. 2) will also be provided with controllable motor-actuated connection mechanisms 24.

In addition to the connection means 24, the rail joints $J_1$, $J_2$ (and $J_3$, $J_4$ if the rear rail is equipped for automatic splitting) have electrical and air connections (not shown) for providing electricity and air to the spring-loaded finger mechanisms and the air motors $M_1$, $M_2$ and for connecting the limit switches $S_{11}$, $S_{12}$, $S_{21}$, $S_{22}$ to the microprocessor 50.

The inventive apparatus comprises various other controllable mechanisms which enable automatic die changing. The slide 11 is provided with a plurality (only two are shown in FIG. 3) of pneumatically-powered movable die clamps 51 which are matingly engageable with corresponding slots 52 in the upper half of the die 13. These clamps have air cylinders (not shown) which are connected to a pressurized air source 53 through a valve 54 which selectively supplies pressurized air to either the opening side or closing side of the air cylinder in response to power signals $V_{dc}$ from the microprocessor 50 such that the die clamps 51 open and close. Limit switches 55 on the slide 11 are tripped by the movement of the die clamps 51, and generate die clamp position signals DCP with values representative of the position of the die clamps (e.g., DCP=0 when the clamps are "open" and DCP=1 when the clamps are "closed").

As shown in FIG. 3, the bolster 15 is provided with controllable mechanisms for enabling movement both vertically and transversely. A bolster wheel motor BWM rotates the axle 56 and wheels 16 of the bolster 15 in response to power signals $V_{bwm}$ from the microprocessor 50, thereby driving the bolster transversely on the tracks 17. A resolver 57, attached to the bolster wheel motor BWM, generates signals $BP_t$ having values representative of the transverse position of the bolster 15. For moving the bolster vertically, a plurality of hydraulic cylinders 58 extend between the axle 56 and the bolster body. These hydraulic cylinders 58 are connected to a hydraulic fluid pump 59 through a valve 60, which selectively supplies hydraulic fluid to either the lifting side or the lowering side of the cylinders in response to signals $V_{hc}$ from the microprocessor 50. When the hydraulic fluid is supplied to the lifting side of the cylinders 58, the bolster 15 is raised, and when the hydraulic fluid is supplied to the lowering side, the bolster is lowered.

A pair of rail brakes 61, one for each terminal segment 23 of the transfer feed rails 18, is provided for securing the rail segments 23, upon disengagement from the segments 22, and thereby preventing undesirable longitudinal movement thereof. These brakes 61 are pneumatically-controlled, being attached to the pressurized air source 53 through a valve 62, which is selectively opened and closed in response to signals $V_{rb}$ from the microprocessor 50.

As indicated previously, the press 10, during working operation, is driven by a conventional motor drive mechanism. However, during the automatic die change sequence, so that the movement of the press components can be more accurately controlled and monitored, the slide 11 and the transfer feed rails 18 are both driven by means of a micro-inch drive (not shown), which is conventional and well-known in the art, and the transfer feed rails 18 are further driven by a small motor 69 (FIG. 4). The micro-inch drive moves the slide 11 and rails 18 through the same cycles of positions as they go through during press operation, but at a rate (e.g., about one cycle per minute) substantially slower than normal operating speed. During the automatic die changing sequence, the micro-inch drive is powered by signals $V_{mid}$ generated by the microprocessor 50. Rotational energy from the micro-inch drive reciprocates the slide 11 and is transferred through a power take off shaft 63 (FIG. 4) to the main transfer feed drive 19 for driving the transfer feed rails 18. A resolver 64, mechanically attached to the power take off shaft 63, generates signals SP having values representative of the vertical position of the slide. Generally, these slide position signals SP have values ranging from 0° to 360°, with 180° corresponding to the "press closed" position (i.e., the slide 11 in its lowest position at the bottom of the stroke) and 0° and 360° corresponding to the "press fully open" position.

The rotational energy of the power take off shaft 63 (FIG. 4) is transferred, through a differential 65, to a cam shaft 66, and thereby to the transfer feed drive 19. Accordingly, the transfer feed rails 18 are driven through a 360° cycle of longitudinal, transverse and vertical positions such that when the press is in operation workpieces are moved (from right to left in FIGS. 2-4) through a series of workstations in the press. A resolver 67, attached to the cam shaft 66, serves as a rail position sensor and generates signals RP having values ranging from 0° to 360° which are representative of the longitudinal, transverse, and vertical positions of the rails 18. More specifically, RP values from 270° through 90° correspond to the "forward stroke" of the transfer feed rails 18 (i.e., that portion of the stroke in which the rails are clamped onto the workpiece and are transporting it to the next workstation), while RP values from 90° through 270° correspond to the "return stroke" (i.e., that portion of the stroke in which the rails are not clamped to the workpiece and are moving longitudinally from left to right in FIGS. 2–4).

It will be noted that the value of the signal SP generated by the slide position sensor (resolver 64) correlates with the value of the signal RP generated by the rail position sensor 67. For example, when the slide 11 is in its "closed" position (i.e., SP=180°), the rails 18 are at the center of the "return stroke" (i.e., RP=180°). In order to prevent damage to the rails 18, they must be clear of the die 13, 14 and the workpiece when SP=180° and RP=180°. To accomplish this, the cams 68 on the camshaft 66 are designed such that during the entire "return stroke" the transfer feed rails 18 remain at a constant vertical position (i.e., at the lowest possible position), and such that during approximately one-third of the "return stroke" (i.e., approximately 150°<RP<210°) the rails remain in their most widely-spaced transverse positions. This position of the rails 18 (150°<RP<210°), in their lowest vertical, and most widely-spaced transverse, arrangement, is known as the "maximum unclamp" position.

The small motor 69 (FIG. 4), known as the transfer-inch drive, is also connected to the camshaft 66 through the differential 65. This motor 69 is driven in response to power signals $V_{tid}$ from the microprocessor 50, and is used to negate inputs to the camshaft 66 from the power take off shaft 63 so that the transfer feed rails 18 may be held stationary while the micro-inch drive reciprocates the slide 11. Moreover, the transfer-inch drive 69 is used to drive the transfer feed rails 18 during all of the portions of the automatic die change sequence in which the slide 11 is stationary (i.e., when the micro-inch drive is not in use).

Figure 7:
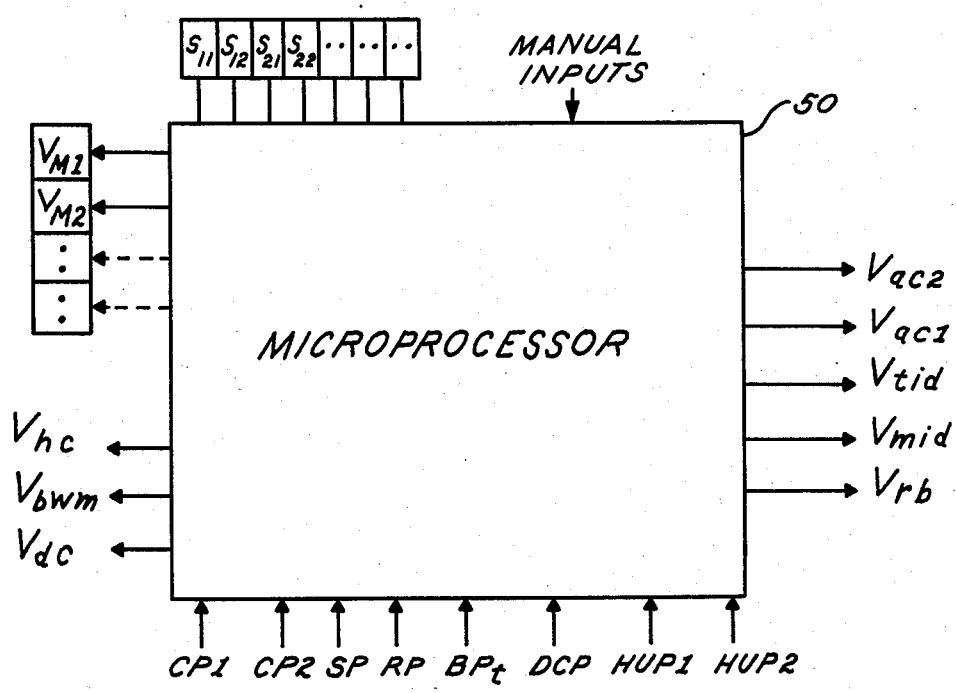
FIG. 7 is a schematic representation of the inputs and outputs of the microprocessor.

As illustrated in FIG. 7, the microprocessor 50 receives signals from a number of sources, which it responds to, in accordance with a programmed sequence of operations, by sending operating signals to the various components of the transfer feed press 10. The predetermined sequence of operations followed by the microprocessor 50 in accomplishing Automatic Die Change (ADC) is shown in the flowchart representations of FIGS. 8–12, and is described in detail hereinafter. While the description of this sequence is given with reference to the two front rail joints J₁, J₂, it will be noted that this same sequence applies, and is in fact carried out concurrently, if desired, for the two rear rail joints J₃, J₄.

Generally, the ADC sequence comprises the steps of simultaneously driving the rails 18 and the slide 11 to the "maximum unclamp" and "press closed" positions, respectively; releasing the upper half of the die 13 onto the lower half of the die 14; driving the slide 11 to a predetermined "press open" position while maintaining the rails 18 in the "maximum unclamp" position; raising the bolster 15 vertically so that the rails 18 rest on the support stands 70; splitting the rails 18 using the transfer feed drive 19 and the controllable motor-actuated connection means 24; driving the old bolster 15 (and the old die 13, 14 and old center rail segments 22) transversely out of the die space; driving the new bolster (and the new die and rails) transversely into the die space; rejoining the rails 18 using the transfer feed drive 19 and the controllable motor-actuated connection means 24; lowering the bolster 15 vertically out of contact with the rails 18; driving the slide 11 to the "press closed" position while maintaining the rails 18 in the "maximum unclamp" position; and connecting the upper half of the new die 13 to the slide 11.

Figure 8:
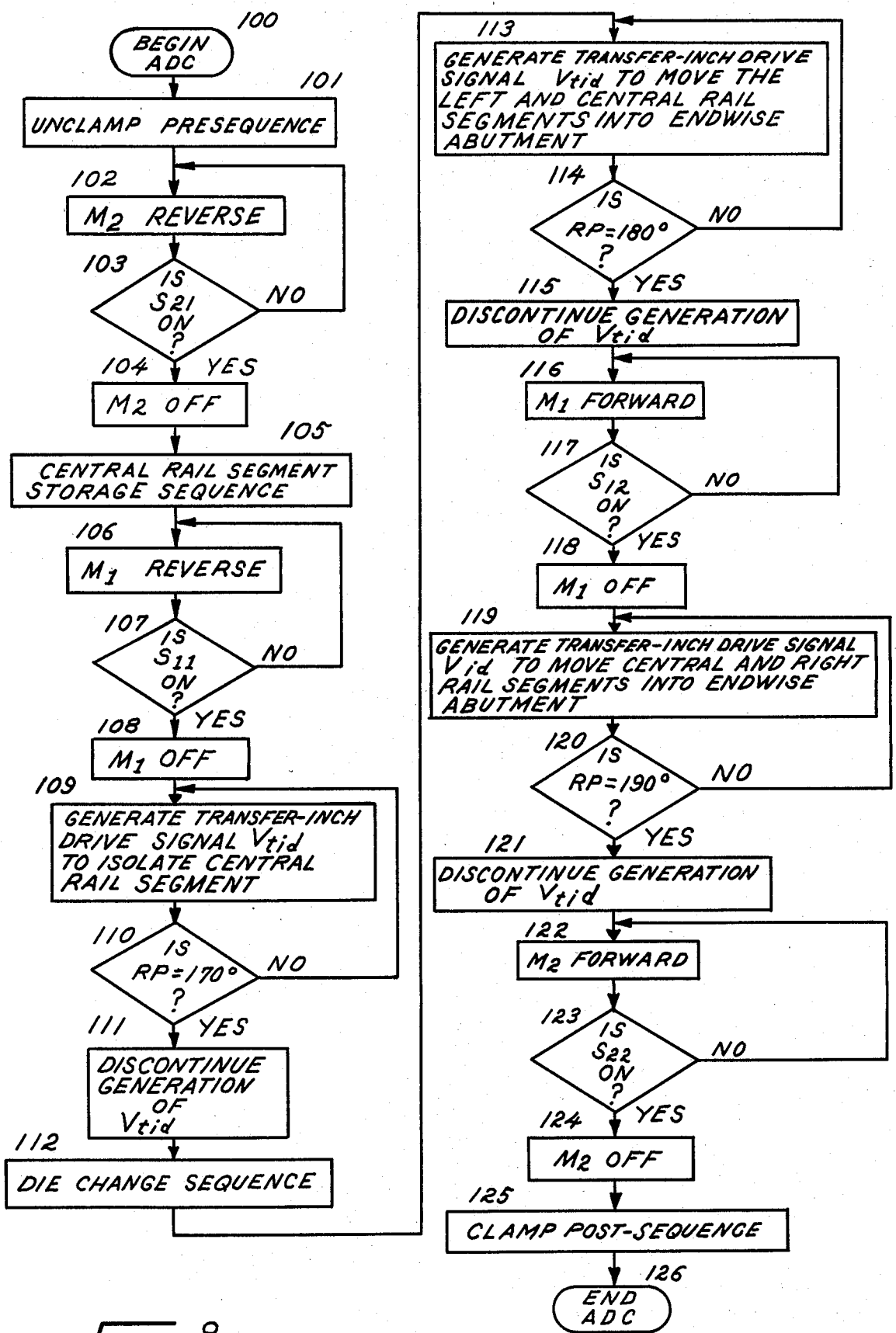
FIG. 8 is a flow chart representation of the sequence of operations followed by the inventive transfer feed press in performing automatic die change.
Figure 9:
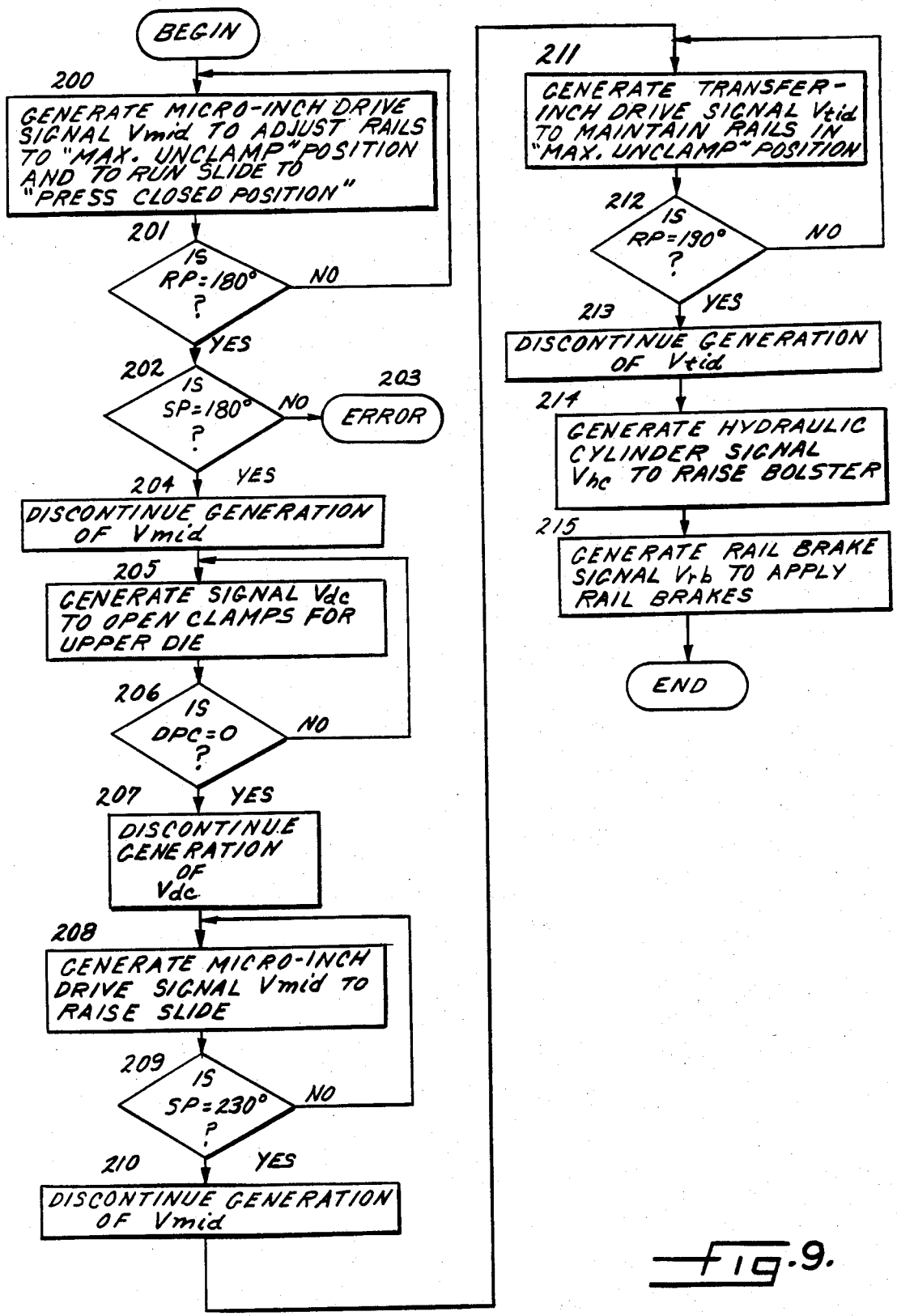
FIG. 9 is a flow chart representation of the unclamp presequence of FIG. 8.

More specifically, and with reference to the flowchart representation of FIG. 8, the ADC procedure begins at step 100 when the machine operator decides that the die needs to be changed and adjusts the appropriate dials on the master panel 71 to select "Die Change" and "Auto", and depresses the ADC button setting the ADC process into motion.

At step 101, the unclamping presequence is initiated, which involves the preliminary arrangements required of the press components prior to actual unclamping of the transfer feed rail joints J₁, J₂. This sequence is described in detail with reference to FIG. 9. The first step 200 entails activating the micro-inch drive to run the slide 11 to the "press closed" position and to adjust the transfer feed rails 18 to the "maximum unclamp" position (as defined previously) over the bolster support stands 70, thus ensuring that when the bolster 15 is raised it will be able to make good contact with the transfer feed rails 18 for subsequent withdrawal as a complete unit. The microprocessor 50 supplies a power signal $V_{mid}$ to the micro-inch drive until it receives (at steps 201 and 202) a rail position signal RP from the resolver 67 having a value of 180° (indicating that the rails 18 are in the center of the return stroke and are in the "maximum unclamp" position) and a slide position signal SP having a value of 180° (indicating that the slide 11 is in the "press closed" position). Since the values of the rail position signal RP and the slide position signal SP are correlated, the slide 11 should be in the "press closed" position when the rails 18 are in the centered "maximum unclamp" position. If the slide position signal SP does not have a value of 180° at step 202, an error signal is produced (step 203) and the ADC sequence is interrupted until the error condition has been corrected. If SP=180° at step 202, the microprocessor 50 discontinues generation of the power signal $V_{mid}$ (step 204).

At step 205, the microprocessor 50 generates a signal $V_{dc}$ so that the valve 54 supplies pressurized air to the opening side of the die clamp air cylinders, and thereby opens the die clamps 51 so that the upper half of the die 13 is released onto the lower half of the die 14. A check is made at step 206 as to whether each of the limit switches 55 is generating a die clamp position signal DCP having a value indicating that the corresponding clamp 51 is open (i.e., DCP=0).

Upon determination that all die clamp position signals DCP have a value of zero, the microprocessor 50 discontinues generation of the power signal $V_{dc}$ (step 207), and again generates a power signal $V_{mid}$ (step 208) running the micro-inch drive in the forward direction so that the slide 11 is raised to a predetermined vertical position (e.g., SP=230°) adequately high to ensure that it will not hinder the transverse motion of the rails 18 or bolster 15 during the die change operation. Once the microprocessor 50 determines, at step 209, that the slide position signal SP corresponds to the predetermined value (e.g., SP=230°), the micro-inch drive is shut off (step 210).

In order to maintain the transfer feed rails 18 in the desired "maximum unclamp" position (i.e., RP=190°) while the micro-inch drive moves the slide 11 to the "press open" position (i.e., SP=230°), the transfer-inch drive 69 is simultaneously activated (steps 211) by a signal $V_{tid}$ from the microprocessor 50 to run in reverse so that the net rotation of the cam shaft 66 of the main transfer feed drive 19, imparted by the outputs of the micro-inch drive and the transfer-inch drive 69 through the differential 65, is zero. The power signal $V_{tid}$ is discontinued (step 213) when SP=230° (step 209) and RP=190° (step 212).

The next step in the unclamp presequence (214) involves raising the bolster 15, by means of the plurality of hydraulic cylinders 58, such that its support stands 70 contact and support the transfer feed rails 18 along their central segments 22. Friction pads 71, 72 on the top surface of the bolster support stands 70 and on the bottom surface of the central segments 22 of the transfer feed rails 18 ensure that the supported rail segments will not slide off the stands as a result of vibration or movement of the bolster 15.

The final step in the unclamp presequence (step 215) involves applying the brakes 61 to the right terminal segments 23 of the transfer feed rails 18 so that, when these segments are disengaged from the central segments 22, they cannot move freely on the rollers 73. To accomplish this, the microprocessor 50 generates a signal $V_{rb}$ which opens the air valve 62 and thereby activates the pneumatically-controlled brakes 61. After this step, the joints $J_1$, $J_2$ are ready to be unclamped in the prescribed sequence.

Reverting to FIG. 8, the succeeding step (102) is where the right joint $J_2$ is first unclamped. To accomplish this, the microprocessor 50 generates a signal $V_{M2}$ which runs motor $M_2$ in reverse so that the threaded rod 31 of the automatic connection mechanism 24 starts retracting from the threaded bore 45. At step 103, a check is made to see if the limit switch $S_{21}$, which indicates when the joint $J_2$ is completely disengaged, has been tripped. If the answer is "no", the program reverts to step 102 where the motor $M_2$ continues in reverse and further retracts the rod 31 from the threaded bore 45. If the answer at step 103 is "yes", however (i.e., the joint $J_2$ is indeed totally disengaged), step 104 is reached and the motor $M_2$ is turned off.

Figure 10:
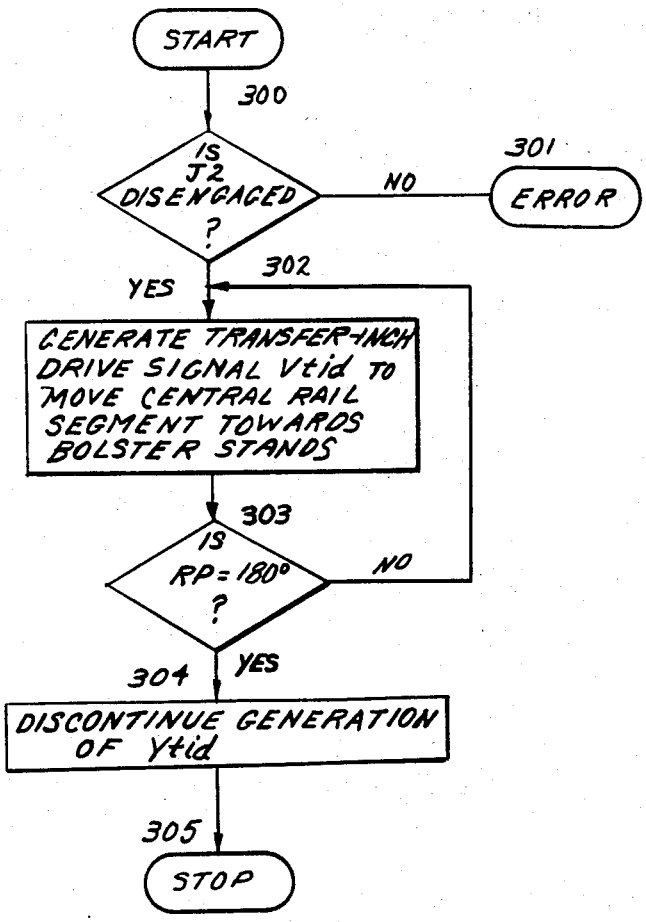
FIG. 10 is a flow chart representation of the central rail segment storage sequence of FIG. 8.

Next (step 105) is the central rail segment storage sequence, which represents the steps involved in the storage of the central segments 22 of the transfer feed rails 18 on the bolster 15 for subsequent die-change, and is described in detail with reference to FIG. 10. The sequence begins at step 300, which is a precautionary step to doublecheck whether the joint $J_2$ is disengaged. If for some reason it is not, an "error" signal is provided at step 301. Otherwise step 302 is reached and the microprocessor 50 generates a signal $V_{tid}$ activating the transfer inch drive 69 such that it moves the main transfer drive 19 and drives the still-connected segments 21, 22 of the transfer feed rails 18 away (to the left in FIGS. 2–4) from the disengaged segment 23. A check is made through the rail position sensor 67 to determine whether the central segment 22 of the transfer rail is centered on the support stands 70 of the bolster 15 (i.e., RP=180°). If the answer is negative, the program reverts to step 302 for further movement of the transfer feed rails 18. A positive indication at step 303 means that the central segment 22 of the transfer feed rails 18 is centered on the support stands 70 of the bolster 15, and the generation of the signal $V_{tid}$ is discontinued (step 304). This marks the end of the central rail segment storage sequence (step 305). The remaining procedure of the ADC sequence in FIG. 8 now continues.

At step 106, the microprocessor 50 generates a signal $V_{M1}$ and runs the air motor $M_1$ in reverse so that the corresponding threaded rod 31 starts retracting from the threaded bore 45 of the joint $J_1$. Step 107 entails checking if the limit switch $S_{11}$, which indicates when joint $J_1$ is completely disengaged, has been tripped. If the answer is negative, the program reverts to step 106 where the motor $M_1$ continues in reverse and retracts the threaded rod 31 further. If the answer at step 107 is positive (i.e., the joint $J_1$ has been completely disengaged) step 108 is reached and the motor $M_1$ is turned off.

Upon disengagement of the joint $J_1$, the microprocessor again generates a signal $V_{tid}$ activating the transfer inch drive (step 109) so that the main transfer drive 19 pulls the terminal rail segment 21 (to the left in FIGS. 2–4) away from the central rail segment 22. When it is determined, at step 110, that the rail position signal RP generated by the rail position sensor 67 has a value of approximately 170°, the transfer inch drive is shut off (step 111).

Figure 11:
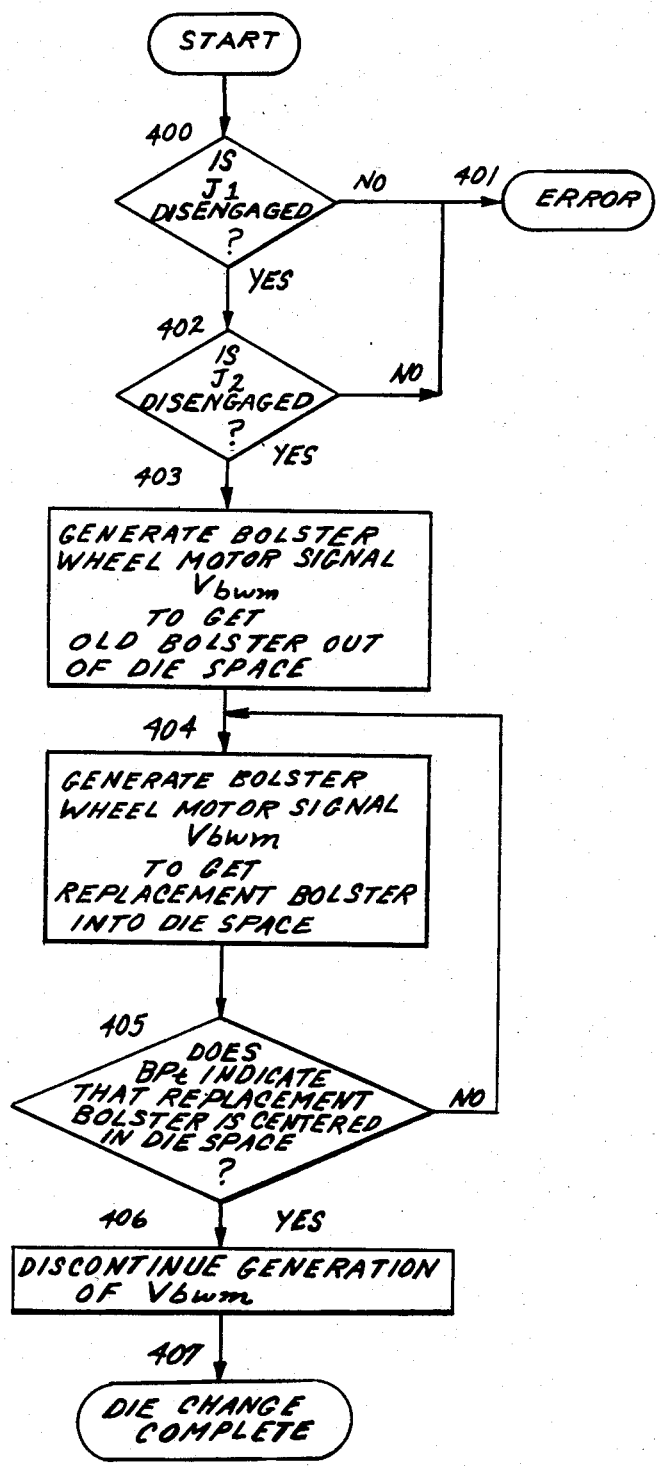
FIG. 11 is a flow chart representation of the die change sequence of FIG. 8.
Figure 12:
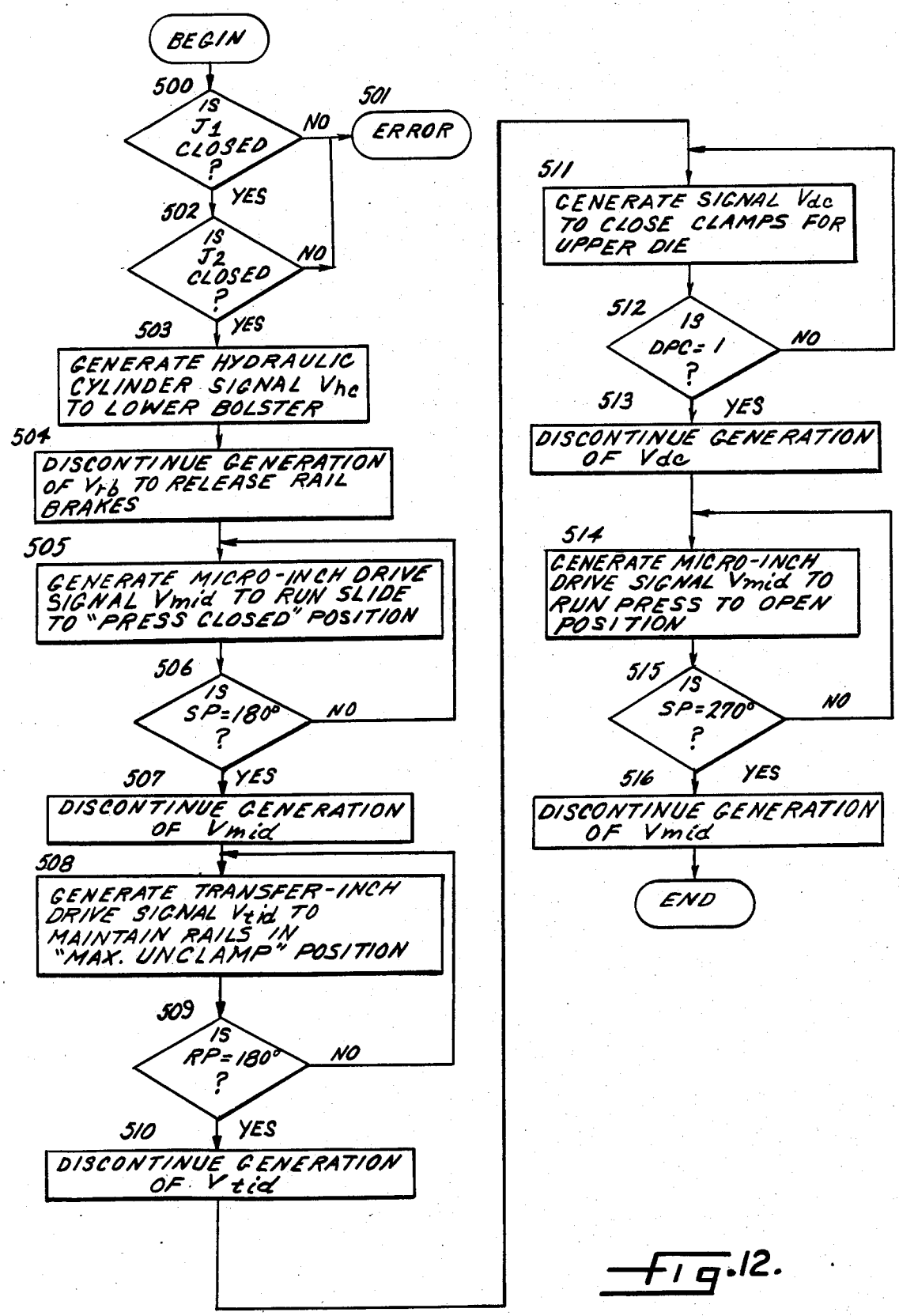
FIG. 12 is a flow chart representation of the clamp post-sequence of FIG. 8.

Step 112 is accessed next and involves the actual die change sequence (described in detail in FIG. 11). Since it is of utmost importance that both joints $J_1$, $J_2$ be disengaged before the die change takes place, steps 400–402 are merely precautionary in nature. Step 400 checks if the joint $J_1$ is disengaged while step 402 checks if the joint $J_2$ is disengaged. If the answer to either of these steps is negative (i.e., one or both of the joints is not completely disengaged) an error signal is generated at step 401 and the ADC sequence is interrupted until the error condition has been corrected. If both of the joints $J_1$, $J_2$ are disengaged, step 403 is reached, where the microprocessor 50 generates a signal $V_{bwm}$ activating the bolster wheel motor BWM to move the original bolster 15 with the old die out of the die space. Next (step 404), another bolster wheel motor BWM is activated to move the replacement bolster with the new die into the die space. It will be noted that two methods of replacing the bolster and die are possible. A first method involves retracting the original bolster along a lone set of bolster tracks 17, removing the old die from the bolster, placing a new die on the bolster, and moving the new die and the bolster into the die space along the same tracks. An alternate, and comparatively faster, method (which is assumed in the flow chart of FIG. 11) is to use a pair of bolster tracks which extend out from both sides of the die space (see FIG. 2). With such an arrangement, the die-carrying bolsters may be fed into and out of the die space from either side, and in this way, the old die can be moved out of the die space on a first bolster while the replacement die is simultaneously brought in on a second bolster.

At step 405, a check is made of the bolster transverse position signal $BP_t$, generated by the resolver 57, to determine whether its value is such as to indicate that the replacement bolster has been centered in the die space. A negative answer reverts the program to step 404 for further maneuvering of the replacement bolster until it is properly centered within the die space. A positive answer at step 405 causes the microprocessor 50 to discontinue generation of the signal $V_{bwm}$ (step 406), and leads to an indication that the die change has been completed (step 407).

Returning to FIG. 8, once the die has been changed, the rail joints $J_1$, $J_2$ must be engaged again. First, at step 113, the main transfer drive 19 (powered by the transfer inch drive) drives the left rail segment 21 into endwise abutment with the central rail segment 22. A check is made at step 114 to determine whether the rail position signal RP has a value of 180°, indicating that the two rail segments 21, 22 are in endwise abutment. Once RP=180°, the transfer inch drive is shut off (step 115).

It will be noted that an alternate method for determining when the rail segments 21, 22 are in endwise abutment can be used which utilizes a limit switch (not shown) attached to the central rail segment 22. A switch-tripping device (also not shown) attached to the first rail segment 21 trips the limit switch when the two rail segments come into abutting alignment, thereby sending a signal to the microprocessor 50. This type of indicating method is useful in situations where there is some uncertainty whether the central rail segment has been stored at the position where the rail position signal RP has a value of exactly 180°.

Next (step 116), the motor $M_1$ is run in the forward direction by the microprocessor 50 so that the threaded rod 31 of the automatic connection mechanism 24 starts screwing into the threaded bore 45 of the joint $J_1$. Step 117 checks whether the limit switch $S_{12}$, which indicates when the joint $J_1$ is fully engaged, has been tripped. If the answer is negative, the program reverts to step 116 where the motor $M_1$ continues running to screw the threaded rod 31 further into the threaded bore 45. If the answer at step 117 is positive (i.e., the joint $J_1$ has been fully engaged), step 118 is reached and the microprocessor 50 turns the motor $M_1$ off.

At step 119, the microprocessor 50 again generates a signal $V_{tid}$ activating the transfer inch drive, which drives the now-connected left and central rail segments 21, 22 until the central segment 22 and the disengaged right rail segment 23 are in endwise abutment (i.e., the rail position sensor 67 reads 190°). Once the sensor 67 generates a rail position signal RP having a value of 190° (step 120), the transfer inch drive is shut off (step 121). (As described above for joint $J_1$, joint $J_2$ may be provided with a limit switch and a switch-tripping device for indicating that the rail segments 22, 23 are in endwise abutment.) Then, at step 122, motor $M_2$ is run in the forward direction so that the threaded rod 31 of the connection mechanism 24 of the joint $J_2$ starts screwing into the threaded bore 45. Step 123 checks if the limit switch $S_{22}$, which indicates when the joint $J_2$ is completely engaged, has been tripped. If the answer is negative, the program reverts to step 122 where the motor $M_2$ continues running in the forward direction. If the answer at step 123 is positive (i.e., the joint $J_2$ has been completely engaged), step 124 is reached and the motor $M_2$ is turned off.

Next is step 125, the clamp post-sequence. This involves the arrangements required to set the press back into normal working conditions subsequent to the die change, and is described in detail with reference to FIG. 12.

Steps 500–502 are of a precautionary nature to ensure that the joints $J_1$, $J_2$ are fully engaged before proceeding further. Step 500 checks if the joint $J_1$ is engaged, while step 502 checks if the joint $J_2$ is engaged. If the answer to either of these steps is negative (i.e., one or both of these joints is not completely engaged), an error signal is produced at step 501, and the ADC sequence is interrupted until the error condition is corrected. If both of the joints $J_1$, $J_2$ are engaged, as they should be, step 503 is accessed, and the microprocessor 50 sends a signal $V_{hc}$ to the valve 60 to retract the hydraulic cylinders 58. The rail brakes 61 are then released (step 504) so that the transfer feed rails 18 are free to move longitudinally on the rollers 73.

Next is step 505, where the micro-inch drive is activated by a signal $V_{mid}$ from the microprocessor 50 to run in reverse, thereby backing the slide 11 to the "press closed" position. At step 506, a check is made to determine whether the slide position signal SP has a value of 180° (indicating that the slide is in the "press closed" position). If the answer at step 506 is negative, the program reverts to step 505 where the micro-inch drive continues backing the slide 11 toward the "press closed" position. When the value of SP is 180° at step 506, the microprocessor 50 shuts off the micro-inch drive (step 507).

Simultaneous to steps 505–507, the microprocessor 50 provides a signal $V_{tid}$ powering the transfer-inch drive 69 (step 508). The transfer-inch drive 69 provides rotational energy to the cam shaft 66, which counters the rotational energy provided during steps 505–507 by the micro-inch drive, and thereby maintains the position of the rails 18 while the slide 11 is lowered to the "press closed" position. Accordingly, the values of the slide position signal SP and the rail position signal RP are again made to match so that when the slide 11 is in the "press closed" position (i.e., SP=180°) the transfer feed rails 18 are centered in the "maximum unclamp" position (i.e., RP=180°) (step 509).

Once it is determined that the slide 11 is in the "press closed" position and the rails 18 are centered in the "maximum unclamp" position, the microprocessor 50 discontinues generation of the signal $V_{tid}$ (step 510), and generates a signal $V_{dc}$ (step 511) activating the valve 54 and thereby closing the die clamps 51 so that the upper half of the new die 13 is attached to the slide 11. A check is made at step 512 to ensure that each of the die clamp limit switches 55 is generating a die clamp position signal DCP having a value indicating that the corresponding clamp 60 is closed (i.e., DCP=1), and if they are, generation of the signal $V_{dc}$ is discontinued (step 513).

Then, at step 514, the microprocessor 50 generates a signal $V_{mid}$ activating the micro-inch drive to run the press to a predetermined open position (e.g., SP=RP=270°). Once the value of SP is determined to be 270° (step 515), the micro-inch drive is shut off (step 516). This marks the end of the clamp post-sequence.

Returning to FIG. 8 (step 126), the automatic die change procedure is now complete and the press is ready to resume normal operation. Generally, it will take approximately ten minutes from the time the machine operator depresses the appropriate buttons on the master panel for the transfer feed press, utilizing the inventive apparatus, to complete the automatic die change sequence of FIG. 8. This is a substantial reduction in press "down time" when compared with presses requiring manual rail splitting, and is achieved without outfitting the press with additional mechanisms for driving the individual segments of the transfer feed rails.

It will further be appreciated that the inventive apparatus may be readily used on transfer feed presses in which the transfer feed rails are divided into more than three segments. Each joint in such presses would need to be provided with a controllable motor-actuated connection mechanism, and additional bolsters would be necessary, but the same general die change procedure could be followed.

As discussed previously, an advantage of removing the central rail segments 22 with the old die and bolster is that it allows changing of the rail tooling (e.g., finger units 20) outside of the press slide region. However, since the terminal rail segments 21, 23 remain in the press during the automatic die change sequence, it is desirable for the finger units 20' attached thereto to be automatically removable, whereupon they too can be changed outside of the press slide region. For this purpose, each end of the central rail segment 22 can be provided with a finger unit removal mechanism 74 (see FIGS. 13 and 14).

When this optional mechanism is used in the transfer feed press, the finger units 20' of the terminal rail segment 23 (and terminal rail segment 21 if two such mechanisms are used) are carried by a movable head unit 75 rather than being rigidly attached to the rail. This head unit 75 is connected to a pivotally mounted L-shaped rocker arm 76 so that it can be moved vertically into and out of contact with the terminal rail segment 23. A carriage 77 serves as the mounting base both for the rocker arm 76 and for a first air cylinder 78. More specifically, the rocker arm 76 is pivotally connected at its elbow to a first end of the carriage 77, while the first air cylinder 78 is pivotally connected to the second end of the carriage 77. The piston rod 79 of the first air cylinder 78 is connected to the end of the rocker arm 76 opposite the head unit 75 so that when the rod 79 is retracted into the cylinder 78, the rocker arm 76 pivots and the head unit 75 is lifted away from the rail 18 (as shown in phantom in FIG. 13).

In order that the rocker arm 76 and head unit 75 can be longitudinally moved to lie entirely above the central rail segment 22, thereby allowing transverse removal of the central rail segment 22 and the finger unit removal mechanism 74 between the support columns 12, the carriage 77 is provided with a female track member (not shown), and a mounting rail 80, rigidly attached to the central rail segment 22 by brackets 81, is provided with a corresponding male track member (also not shown). The female track member slidably engages the male track member, thereby providing support on the central rail segment 22 for the carriage 77 and yet allowing longitudinal movement of the carriage 77 (as well as the rocker arm 76 and head unit 75 attached thereto). For longitudinally driving the carriage 77, a second air cylinder 82 is provided. This second air cylinder 82 is positioned parallel to the rail 18 by a bracket 83 with its piston rod 84 extending toward the carriage 77. A collar 85 and a pin 86 connect the piston rod 84 to the carriage 77.

Four limit switches 87, 88, 89, 90 are used to indicate the longitudinal and vertical position of the head unit 75. The first limit switch 87 is mounted on the first air cylinder 78 and generates a signal HUP1 indicative of the vertical position of the head unit (e.g., HUP1=1 when the head unit is fully raised). Upon activation of the first air cylinder 78, and complete retraction of the piston rod 79 thereinto, a rod shoulder 91 contacts the first limit switch 87 and a signal HUP1=1 is generated. The second limit switch 88 is mounted on the terminal rail segment 23 and is tripped by the rocker arm 76 when the head unit 75 is in contact with the terminal rail segment. Therefore, the signal HUP2 generated by this switch indicates when the head unit 75 and finger units 20' are in their operational positions (e.g., HUP2=1 when the head unit is in contact with the rail).

The third and fourth limit switches 89, 90 generate signals indicative of the longitudinal position of the carriage 77, and therefore, the head unit. The signal CP1 generated by the third limit switch 89 has a value of 1 when the carriage 77 is positioned such that the head unit 75 lies above the central rail segment 22 (i.e., to the left of the second rail joint $J_2$ in FIG. 13), and the signal CP2 generated by the fourth limit switch 90 has a value of 1 when the head unit 75 lies above the terminal rail segment 23.

If the transfer feed press described previously is provided with finger unit removal mechanisms 74, the ADC sequence (FIG. 8) comprises two additional subsequences: a first for removing the old finger units 20' from the terminal rail segments, and a second for placing new finger units on the terminal rail segment.

Figure 15:
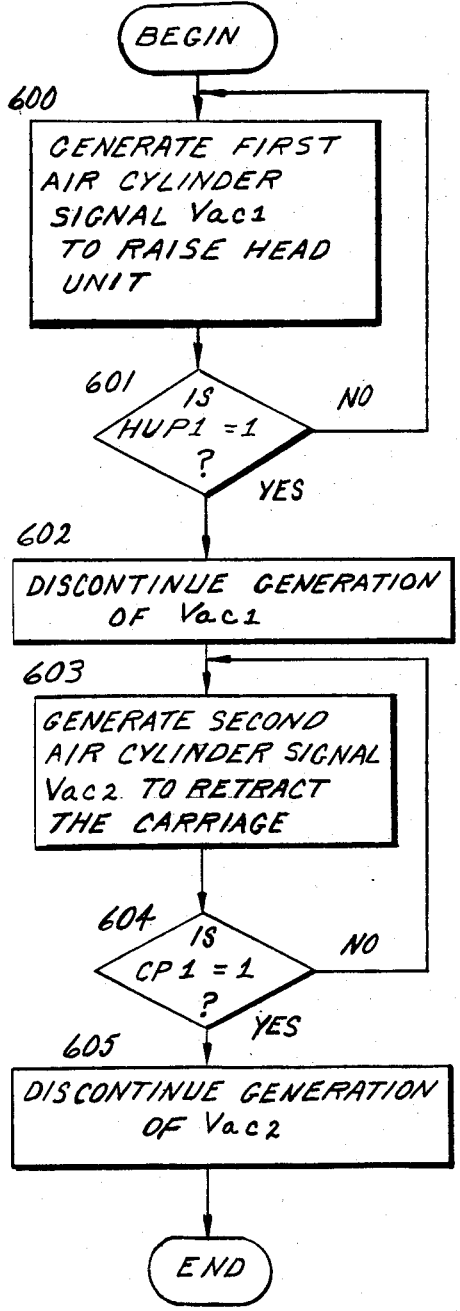
FIG. 15 is a flow chart representation of the finger unit removal sequence.

The finger unit removal sequence (FIG. 15) occurs immediately after completion of the unclamp presequence (step 101) and before activation of motor $M_2$ (step 102). At step 600 (FIG. 15), the microprocessor 50 generates a signal $V_{ac1}$ activating the valve 92 so that air from the pressurized air source 53 is applied to the positive (+) side of the first air cylinder, thereby causing the rocker arm 76 to pivot which raises the head unit 75. A check is made at step 601 to determine the value of the first head unit position signal HUP1 generated by the first limit switch 87. If HUP1 does not have a value of 1, the program reverts to step 600 and continues generation of $V_{ac1}$. However, if HUP1=1, generation of $V_{ac1}$ is discontinued (step 602). Next (step 603), the microprocessor generates a second air cylinder signal $V_{ac2}$ which activates a valve 93 so that air from the pressurized air source 53 is applied to the positive (+) side of the second air cylinder 82. This causes the carriage 77 to be drawn toward the second air cylinder. At step 604, a check is made of the value of the first carriage position signal CP1. If CP1=0, generation of $V_{ac2}$ continues, but if CP1=1, generation of $V_{ac2}$ is discontinued (step 605), and the finger unit removal sequence is complete.

Figure 16:
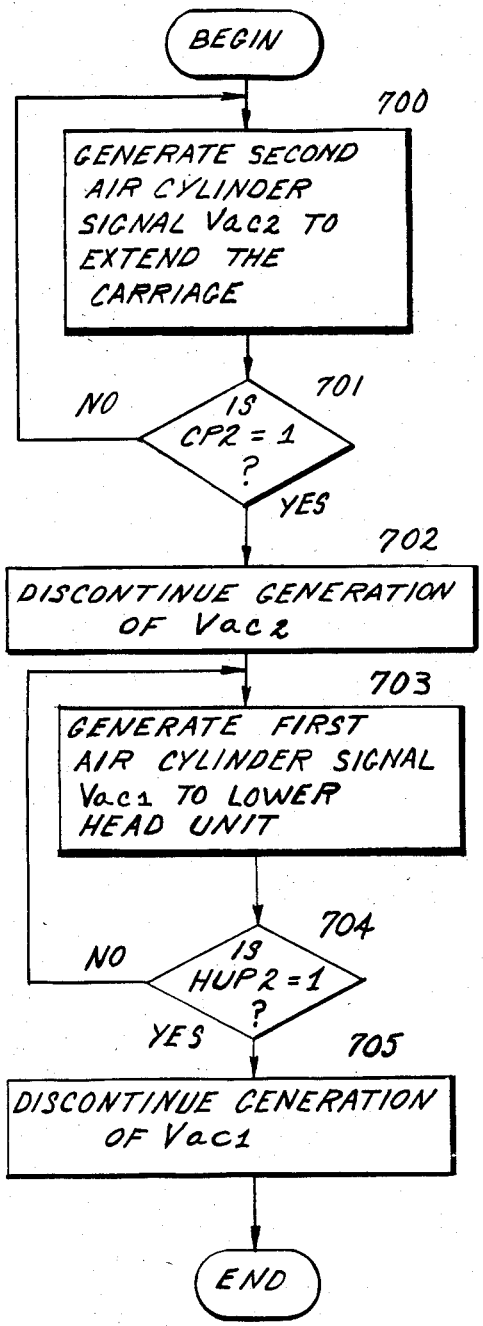
FIG. 16 is a flow chart representation of the finger unit placement sequence.

The finger unit placement sequence (FIG. 16) occurs after clamping of the second rail joint has been completed (step 124 in FIG. 8) but before initiation of the clamp post sequence (step 125). This sequence begins at step 700 with the microprocessor 50 generating a second air cylinder signal $V_{ac2}$ which activates the valve 93 so that pressurized air is applied to the negative (−) side of the second air cylinder 82. At step 701, the value of the second carriage position signal CP2, generated by the third limit switch 90, is checked. Generation of $V_{ac2}$ continues if CP2=0, but is discontinued if CP2=1 (step 702). Next, at step 703, the microprocessor 50 generates a first air cylinder signal $V_{ac1}$ so that the valve 92 directs pressurized air to the negative (−) side of the first air cylinder 78, whereupon the rocker arm 76 pivots and the head unit 75 begins lowering toward the terminal rail segment 23. A check is made at step 704 of the value of the second head unit position signal HUP2. If HUP2=0 generation of $V_{ac1}$ continues, but if HUP2=1 (indicating that the head unit 75 is in contact with the terminal rail segment 23), generation of $V_{ac1}$ discontinues and the finger unit placement sequence ends.

As can be seen from the foregoing detailed description, the present invention provides an improved apparatus for automatically splitting the transfer feed rails of a transfer feed press which does not require rail drive mechanisms in addition to the main transfer drive mechanism used when the press is in operation. This apparatus is also economical to manufacture and is readily adaptable to transfer feed presses in which the rails must be split into different numbers of segments. Moreover, if finger unit removal mechanisms are utilized, this apparatus enables automatic removal of all finger units so that they can be changed outside the die space.

What is claimed is:

1. In a transfer feed press having a main motor means, a vertically movable slide and one or two longitudinally movable multi-segment transfer feed rails for moving workpieces through the press, a system for automatically splitting and re-joining at least one of said transfer feed rails in response to manually-input signals from the press operator, the improvement comprising:

slide position sensor means connected to said main motor means for generating signals regarding the vertical position of said slide;

main transfer drive means attached to one end of said transfer feed rails for driving said transfer feed rails longitudinally, said main transfer drive means having rail position sensor means for generating signals regarding the longitudinal position of said transfer feed rails;

first and second controllable motor means for driving said main transfer drive means, each of said controllable motor means being independent from said main motor means;

vertically movable support means for supporting at least one segment of said transfer feed rails, said support means having controllable vertical positioning means for selectively raising and lowering said support means;

at least two controllable motor-actuated connection means for connecting and disconnecting said transfer feed rail segments; and microprocessor means for controlling the automatic splitting and re-joining of the transfer feed rails having a program for generating a predetermined sequence of signals in response to predetermined manually-input signals and signals generated by predetermined press components, said microprocessor means actuating said first and second controllable motor means to drive said main transfer drive means, and thereby said transfer feed rails, so that said transfer feed rails are moved through a predetermined sequence of longitudinal positions, actuating said vertical positioning means so that in response to predetermined signals from said rail position sensor means representing longitudinal positions of said transfer feed rails, said support means are moved vertically into and out of supporting contact with said transfer feed rails, and actuating each of said motor-actuated connection means in a predetermined sequence so that said transfer feed rail segments are connected and disconnected in response to predetermined signals from said slide position sensor means representing vertical positions of said slide and from said rail position sensor means representing longitudinal positions of said transfer feed rails.

2. The apparatus of claim 1 wherein said main transfer drive means comprises the mechanism by which said transfer feed rails are driven during working operation of said transfer feed press.

3. The apparatus of claim 1 wherein each of said controllable motor-actuated connection means comprises a first section for insertion into the end of a first rail segment having a longitudinally movable threaded rod and controllable motorized means for driving said rod, and a second section for insertion into the end of a second adjacent rail segment having a threaded bore receptive of said longitudinally movable threaded rod and connection indicator means for generating a signal indicating whether said rod is threaded into said bore.

4. The apparatus of claim 3 wherein said controllable motorized means comprises an air motor.

5. The apparatus of claim 3 wherein said controllable motorized means comprises a servo motor.

6. The apparatus of claim 3 wherein said connection indicator means comprises a rod which is spring-biased to axially extend at one of its ends through said threaded bore so that said threaded rod longitudinally displaces it as said threaded rod is driven by said controllable motorized means into threaded engagement with said bore, and which has collar means fixedly attached at its other end for tripping at least one limit switch and thereby indicating whether said rod and bore are in threaded engagement.

7. The apparatus of claim 6 wherein said collar means comprises first and second spaced-apart collars for tripping first and second limit switches, respectively, the tripping of said first limit switch indicating that said threaded rod and threaded bore are fully engaged and the tripping of said second limit switch indicating that said threaded rod and threaded bore are fully disengaged.

8. The apparatus of claim 1 wherein said vertically movable support means comprises a bolster for carrying dies in and out of said transfer feed press having vertically movable support stands and having wheels and driving means for enabling transverse movement.

9. The apparatus of claim 8 wherein said support stands are vertically movable in that the entirety of said bolster can be vertically raised and lowered by said controllable vertical positioning means.

10. In a transfer feed press having a main motor means, a vertically movable slide and one or two longitudinally movable multi-segment transfer feed rails for moving workpieces through the press, a system for automatically splitting and re-joining at least one of said transfer feed rails in response to manually-input signals from the press operator, the improvement comprising:

slide position sensor means connected to said main motor means for generating signals regarding the vertical position of said slide;

main transfer drive means attached to one end of said transfer feed rails for driving said transfer feed rails longitudinally, said main transfer drive means comprising the mechanism by which said transfer feed rails are driven during working operation of said transfer feed press, said main transfer drive means having rail position sensor means for generating signals regarding the longitudinal position of said transfer feed rails;

first and second controllable motor means for driving said main transfer drive means, each of said controllable motor means being independent from said main motor means;

vertically movable support means for supporting at least one segment of said transfer feed rails, said support means having controllable vertical positioning means for selectively raising and lowering said support means;

at least two controllable motor-actuated connection means for connecting and disconnecting said transfer feed rail segments; and microprocessor means for controlling the automatic splitting and re-joining of the transfer feed rails having a program for generating a predetermined sequence of signals in response to predetermined manually-input signals and signals generated by predetermined press components, said microprocessor means actuating said first and second controllable motor means to drive said main transfer drive means, and thereby said transfer feed rails, so that said transfer feed rails are moved through a predetermined sequence of longitudinal positions, actuating said vertical positioning means so that in response to predetermined signal from said rail position sensor means representing longitudinal positions of said transfer feed rails, said support means are moved vertically into and out of supporting contact with said transfer feed rails, and actuating each of said motor-actuated connection means in a predetermined sequence so that said transfer feed rail segments are connected and disconnected in response to predetermined signals from said slide position sensor means representing vertical positions of said slide and from said rail position sensor means representing longitudinal positions of said transfer feed rails.

11. The apparatus of claim 10 wherein each of said controllable motor-actuated connection means comprises a first section for insertion into the end of a first rail segment having a longitudinally movable threaded rod and controllable motorized means for driving said rod, and a second section for insertion into the end of a second adjacent rail segment having a threaded bore receptive of said longitudinally movable threaded rod and connection indicator means for generating a signal indicating whether said rod is threaded into said bore.

12. The apparatus of claim 11 wherein said controllable motorized means comprises an air motor.

13. The apparatus of claim 11 wherein said controllable motorized means comprises a servo motor.

14. The apparatus of claim 11 wherein said connection indicator means comprises a rod which is spring-biased to axially extend at one of its ends through said threaded bore so that said threaded rod longitudinally displaces it as said threaded rod is driven by said controllable motorized means into threaded engagement with said bore, and which has collar means fixedly attached at its other end for tripping at least one limit switch and thereby indicating whether said rod and bore are in threaded engagement.

15. The apparatus of claim 14 wherein said collar means comprises first and second spaced-apart collars for tripping first and second limit switches, respectively, the tripping of said first limit switch indicating that said threaded rod and threaded bore are fully engaged and the tripping of said second limit switch indicating that said threaded rod and threaded bore are fully disengaged.

16. The apparatus of claim 10 wherein said vertically movable support means comprises a bolster for carrying dies in and out of said transfer feed press having vertically movable support stands and having wheels and driving means for enabling transverse movement.

17. The apparatus of claim 16 wherein said support stands are vertically movable in that the entirety of said bolster can be vertically raised and lowered by said controllable vertical positioning means.

18. In a transfer feed press having a vertically movable slide, one or two longitudinally movable multi-segment transfer feed rails for moving workpieces through the press, a bolster movable transversely in and out of the press and vertically within the press, and vertically movable rail support stands on the bolster, a die-changing control system, the improvement comprising the combination of:
at least two controllable motor-actuated means for connecting and disconnecting said transfer feed rail segments;
means for generating electrical signals representing:
(1) the press slide position;
(2) the rail position along the longitudinal transverse and vertical axes;
(3) the bolster position along the transverse and vertical axes; and
(4) the position of the rail support stands on the bolster; and
control means for actuating said controllable motor-actuated means for connecting and disconnecting said transfer feed rail segments in response to said electrical signals when
(1) the press slide is in a raised position high enough to permit safe removal of the bolster and die from the press,
(2) the rail position is centered over the bolster and the rail support stands carried by the bolster,
(3) the bolster is in its advanced vertical position within the press, and
(4) the rail support stands on the bolster are in their raised positions.

19. In a transfer feed press having one or two longitudinally movable multi-segment transfer feed rails with finger units positioned along the length thereof for moving workpieces through the press and having a system for automatically splitting and rejoining at least one of said transfer feed rails in response to manually-input signals from the press operator such that the central rail segment and its finger units are transversely removed from said press while the terminal rail segments and their finger units remain in the press, an apparatus for automatically removing said terminal rail segment finger units from said press along with said central rail segment, the improvement comprising:
carriage means in longitudinally slidable engagement with said central rail segment;
first controllable driving means for longitudinally driving said carriage means;
armature means pivotally mounted on said carriage means, said armature means comprising a bent arm having first and second arm segments and an elbow therebetween by which it is pivotally connected to said carriage means, said first arm segment being adapted at its end opposite said elbow for carrying said terminal rail segment finger units and said second arm segment forming substantially a right angle with said first arm segment;
second controllable driving means connected to said second arm segment at its end opposite said elbow for causing said armature means to pivot, thereby vertically moving said terminal rail segment finger units; and
microprocessor means for controlling the automatic removal of said terminal rail segment finger units having a program for generating a predetermined sequence of signals in response to signals generated by predetermined press components, said microprocessor means actuating said second controllable driving means for pivoting said armature means and thereby vertically moving said terminal rail segment finger units and actuating said first controllable driving means for longitudinally moving said carriage means.

20. The apparatus of claim 19 wherein each of said first and second controllable driving means comprises the combination of an air cylinder, a controllable three-way valve and a pressurized air source.

21. In a transfer feed press having a main motor means and one or two longitudinally movable multi-segment transfer feed rails with finger units positioned along the length thereof for moving workpieces through the press, a system for automatically splitting and re-joining at least one of said transfer feed rails in response to manually input signals from the press operator such that the central rail segment and its finger units and the terminal rail segment finger units are removed transversely from said press while the terminal rail segments remain in the press, the improvement comprising:

main transfer drive means attached to one end of said transfer feed rails for driving said transfer feed rails longitudinally, said main transfer drive means having rail position sensor means for generating signals regarding the longitudinal position of said transfer feed rails;

first and second controllable motor means for driving said main transfer drive means, each of said controllable motor means being independent from said main motor means;

vertically and transversely movable support means for supporting at least one central rail segment, said support means having controllable positioning means for selectively raising and lowering said support means and for transversely moving said support means;

at least two controllable motor-actuated connection means for connecting and disconnecting said transfer feed rail segments;

carriage means in longitudinally slidable engagement with said central rail segment;

first controllable driving means for longitudinally driving said carriage means;

armature means pivotally mounted on said carriage means, said armature means comprising a bent arm having first and second arm segments and an elbow therebetween by which said bent arm is pivotally connected to said carriage means, said first arm segment being adapted at its end opposite said elbow for carrying said terminal rail segment finger units and said second arm segment forming substantially a right angle with said first arm segment;

second controllable driving means connected to said second arm segment at its end opposite said elbow for causing said armature means to pivot, thereby vertically moving said terminal rail segment finger units; and microprocessor means for controlling the automatic splitting and re-joining of the transfer feed rails and the vertical and longitudinal movement of said terminal rail segment finger units having a program for generating a predetermined sequence of signals in response to predetermined manually-input signals and signals generated by predetermined press components, said microprocessor means actuating said first and second controllable motor means to drive said main transfer drive means, and thereby said transfer feed rails, so that said transfer feed rails are moved through a predetermined sequence of longitudinal positions, actuating said controllable positioning means so that in response to predetermined signals from said rail position sensor means representing longitudinal positions of said transfer feed rails said support means are moved vertically into and out of supporting contact with said central rail segments, actuating each of said motor-actuated connection means in a predetermined sequence so that said transfer feed rail segments are connected and disconnected in response to predetermined signals from said rail position sensor means representing longitudinal positions of said transfer feed rails, actuating said second controllable driving means for pivoting said armature means and thereby vertically moving said terminal rail segment finger units, and actuating said first controllable driving means for longitudinally moving said carriage means.

* * * * *